United States Patent
Yang et al.

(10) Patent No.: US 11,457,074 B2
(45) Date of Patent: Sep. 27, 2022

(54) USING OUTCOME-TARGETED GAP PREDICTIONS TO IDENTIFY A DIGITAL RESOURCE

(71) Applicant: Microsoft Technology Licensing, LLC, Redmond, WA (US)

(72) Inventors: Kaiyu Yang, Sunnyvale, CA (US); Li Yang, Palo Alto, CA (US); Yongzheng Zhang, San Jose, CA (US); Shen Huang, San Jose, CA (US); Clayton Sanford, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 16/370,690

(22) Filed: Mar. 29, 2019

(65) Prior Publication Data
US 2020/0314201 A1    Oct. 1, 2020

(51) Int. Cl.
*H04L 67/30* (2022.01)
*G06N 20/00* (2019.01)
(Continued)

(52) U.S. Cl.
CPC .............. *H04L 67/30* (2013.01); *G06N 20/00* (2019.01); *G09B 5/00* (2013.01); *H04L 47/82* (2013.01);
(Continued)

(58) Field of Classification Search
CPC ....................................................... H04L 67/30
See application file for complete search history.

(56) References Cited

U.S. PATENT DOCUMENTS

2007/0259324 A1* 11/2007 Frank .................... G09B 5/14
434/322
2007/0276851 A1* 11/2007 Friedlander ........... G06F 16/283
(Continued)

OTHER PUBLICATIONS

Ben-Hur A., Weston J. (2010) A User's Guide to Support Vector Machines. In: Carugo O., Eisenhaber F. (eds) Data Mining Techniques for the Life Sciences. Methods in Molecular Biology (Methods and Protocols), vol. 609. Humana Press, https://doi.org/10.1007/978-1-60327-241-4_13 (Year: 2010).*

*Primary Examiner* — Nicholas P Celani
(74) *Attorney, Agent, or Firm* — Nicholson De Vos Webster & Elliott LLP (57) ABSTRACT

An embodiment of the disclosed technologies includes extracting, from an online connection network, digital data comprising target profile data and current profile data; where the target profile data is associated with an online submission process that has a plurality of possible outcomes and is executable via the online connection network; where the current profile data is associated with a member node of the online connection network; using an active learning process, in response to the current profile data, identifying attribute data that is in the target profile data but is not in the current profile data and is predicted to have a relationship with a positive outcome of the online submission process; outputting the attribute data for use by a downstream process or an automated digital assistant to determine a digital resource to associate with the member node through the online connection network or through an online learning system.

18 Claims, 5 Drawing Sheets

(51) Int. Cl.
*H04L 67/10* (2022.01)
*H04L 47/70* (2022.01)
*G09B 5/00* (2006.01)
*G09B 5/06* (2006.01)
*G06Q 50/00* (2012.01)
*G09B 5/02* (2006.01)
*G09B 5/04* (2006.01)

(52) U.S. Cl.
CPC ............ *H04L 67/10* (2013.01); *G06Q 50/01* (2013.01); *G09B 5/02* (2013.01); *G09B 5/04* (2013.01); *G09B 5/065* (2013.01)

(56) References Cited

U.S. PATENT DOCUMENTS

2014/0122407 A1* 5/2014 Duan ........................ G06N 5/02
 706/50
2017/0270487 A1* 9/2017 Rennison ........... G06Q 10/1053

\* cited by examiner

USING OUTCOME-TARGETED GAP PREDICTIONS TO IDENTIFY A DIGITAL RESOURCE

TECHNICAL FIELD

A technical field to which this disclosure relates is online content delivery systems, such as online learning systems. Another technical field to which this disclosure relates is online connection networks, such as professional social networks.

BACKGROUND

Online content delivery systems offer digital content, such as videos, for consumption by end users. Online learning systems are one type of content delivery system. Online learning systems provide training videos and other digital learning resources to end users via a network-based platform.

An online connection network can use a graph to model relationships between entities, such as members of an online service, that use the online service Members of an online service can include individuals and/or business entities, such as corporations and educational institutions. Entities may be represented in the graph by nodes. A node has associated profile data. An online connection between two entities may be represented in the graph by an edge between the nodes.

Entities may use the online connection network to distribute information, to establish digital relationships with other entities, or to obtain information. An online connection network may provide services such as news feeds, electronic messaging, job postings, online portals, such as for submitting and receiving job applications, and/or other online services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, the disclosed technologies include extracting, from an online connection network, digital data that includes target profile data and current profile data. The target profile data is associated with an online submission process that has multiple possible outcomes. The online submission process is executable via the online connection network. In an embodiment, the online submission process includes a process for submitting job applications through an online system, for example in response to a job opening posted via the online system. Thus, in an embodiment, examples of profile data include, but are not limited to, entity names, skills, job titles, educational background, geographic locations. For example, current profile data includes, in an embodiment, skills data currently associated with one or more particular member nodes, while target profile data includes skills data associated with one or more online job postings.

In an embodiment, an active learning process is used to, in response to the current profile data, identify attribute data that is in the target profile data but is not in the current profile data and which is predicted to have a relationship with a positive outcome of the online submission process. An example of attribute data includes but is not limited to a particular skill that, if the skill were associated with the member node, would increase the likelihood of the online submission process having a positive outcome for the entity represented by the member node. This disclosure uses skills for illustrative purposes, but other attribute data, such as job titles, educational titles, or any combination of attribute data, can be used alternatively or in addition to skills data.

An example of a positive outcome of the online submission process occurs when an entity has, via its member node, submitted an application through the online submission process, has been extended an offer (such as a job offer), and/or has accepted the offer. An example of a non-positive outcome occurs when an entity has submitted an application but has not received an offer. This disclosure uses job postings and online job application submission processes for illustrative purposes, but the disclosed technologies are equally applicable to other types of online submission processes, including but not limited to applications for membership to clubs or organizations, applications for admission to schools, and to online offer submissions, such as offers to buy or lease personal or real property where the offers are submitted in response to an online for-sale or for-lease listing, and the offers may be accepted or declined.

In an embodiment, the attribute data is output for use by a downstream process or an automated digital assistant, each or either of which may use the attribute data to determine a digital resource to associate with the member node through the online connection network or through an online system. In an embodiment, the online system is an online learning system, but in other embodiments the online system may include any type of online content delivery service. Examples of digital resources include but are not limited to digital content, such as training videos, and digital connection recommendations. Digital connection recommendations generated through the use of the disclosed technologies can identify, for a particular member entity, other entities using the online connection network that may be able to assist or collaborate with the member entity to improve the member entity's likelihood of achieving a positive outcome in an online submission process.

Examples of shortcomings of prior approaches that are addressed by the disclosed technologies include but are not limited to inaccuracies resulting from misidentification of key skills or misalignment of the target skill set. Such inaccuracies are due primarily to the inability of prior approaches to identify particular skills that are both lacking by the member entity and key determinants of positive outcomes.

In an embodiment, the disclosed technologies use a combination of machine learning-based technologies to uncover relationships between particular attribute data, such as particular skills, and particular outcome data, such as positive outcomes including but not limited to acceptance of an application or offer leading to consummation of a transaction, such as hiring of a candidate to fill a job opening, admission of a candidate to an organization, purchasing of property, etc.

The output of the disclosed technologies is actionable by downstream processes or online systems. In an embodiment, actionable output of the disclosed technologies can be used by an online system to choose an execution path or to select digital content for output to a particular member entity. An illustrative, a non-limiting example of an online system using the actionable output of the disclosed technologies to choose an execution path includes the online system determining whether to generate a digital recommendation or not generate a digital recommendation in response to an online interaction of a particular member entity.

An illustrative, non-limiting example of an online system using the actionable output of the disclosed technologies to select digital content is the online system including, in a digital communication, a link to a particular video segment or a digital image associated with a particular member node. Another illustrative, non-limiting example involves an online system using actionable output of the disclosed technologies to determine or modify one or more runtime decisions made by the online system, such as modifying or re-configuring a user interface display screen in response to the actionable output.

The disclosed technologies are not limited to the above advantages. Other advantages may be realized by any one or more embodiments of the disclosed technologies.

Process Overview

Figure 1:
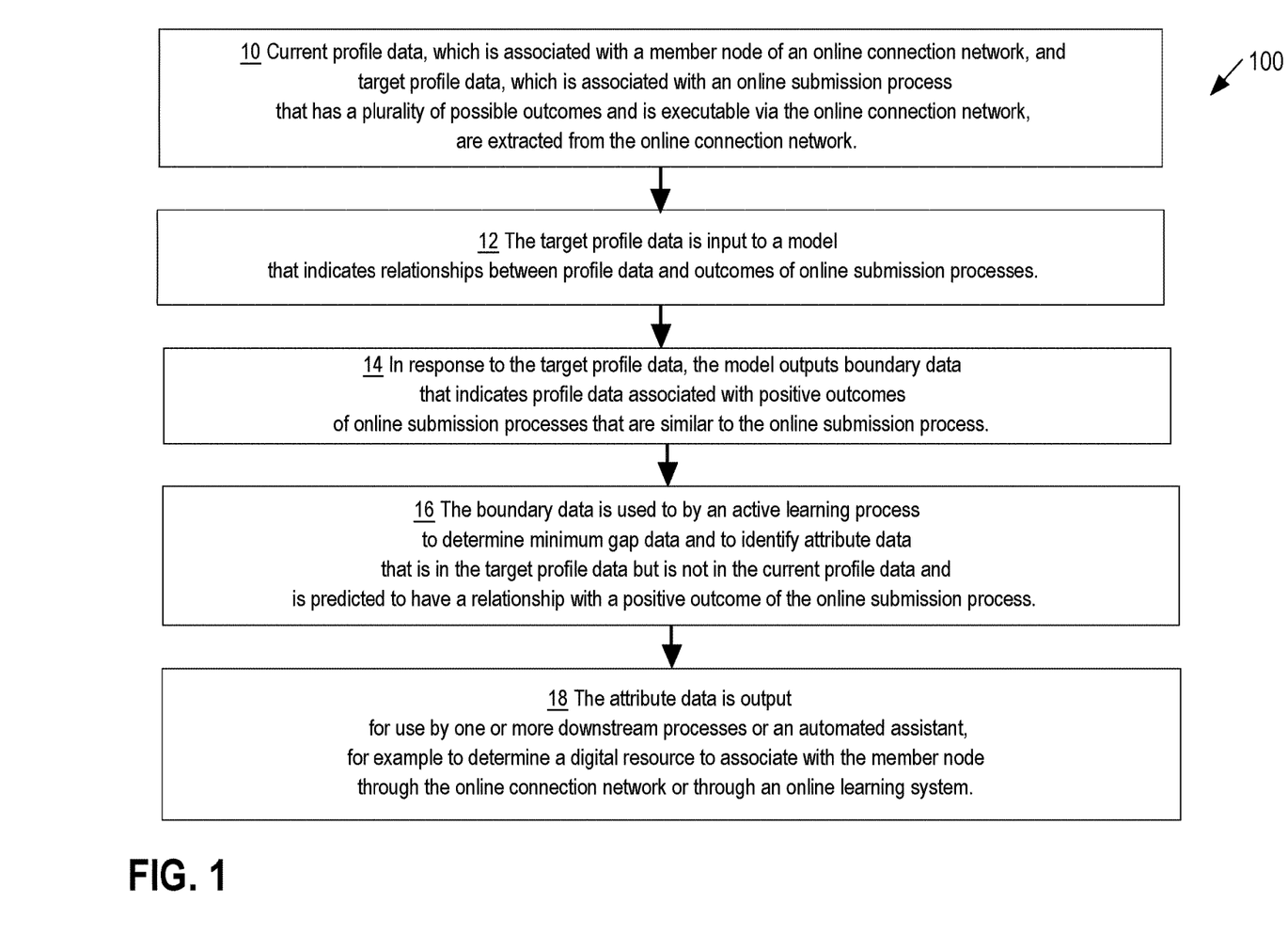
FIG. 1 is a flow diagram of a process, in an embodiment.

FIG. 1 is a flow diagram that depicts a process 100 that can be performed by a computer system, in an embodiment. Portions of process 100 may be performed by a single entity or program or by multiple entities or programs, including for example a plug-in and a server computer. In an embodiment, portions of process 100 may be implemented as a plug-in to an automated digital assistant or an online connection network or an online learning system. As such, the operations of the process as shown in FIG. 1 can be implemented using processor-executable instructions that are stored in computer memory.

Figure 3:
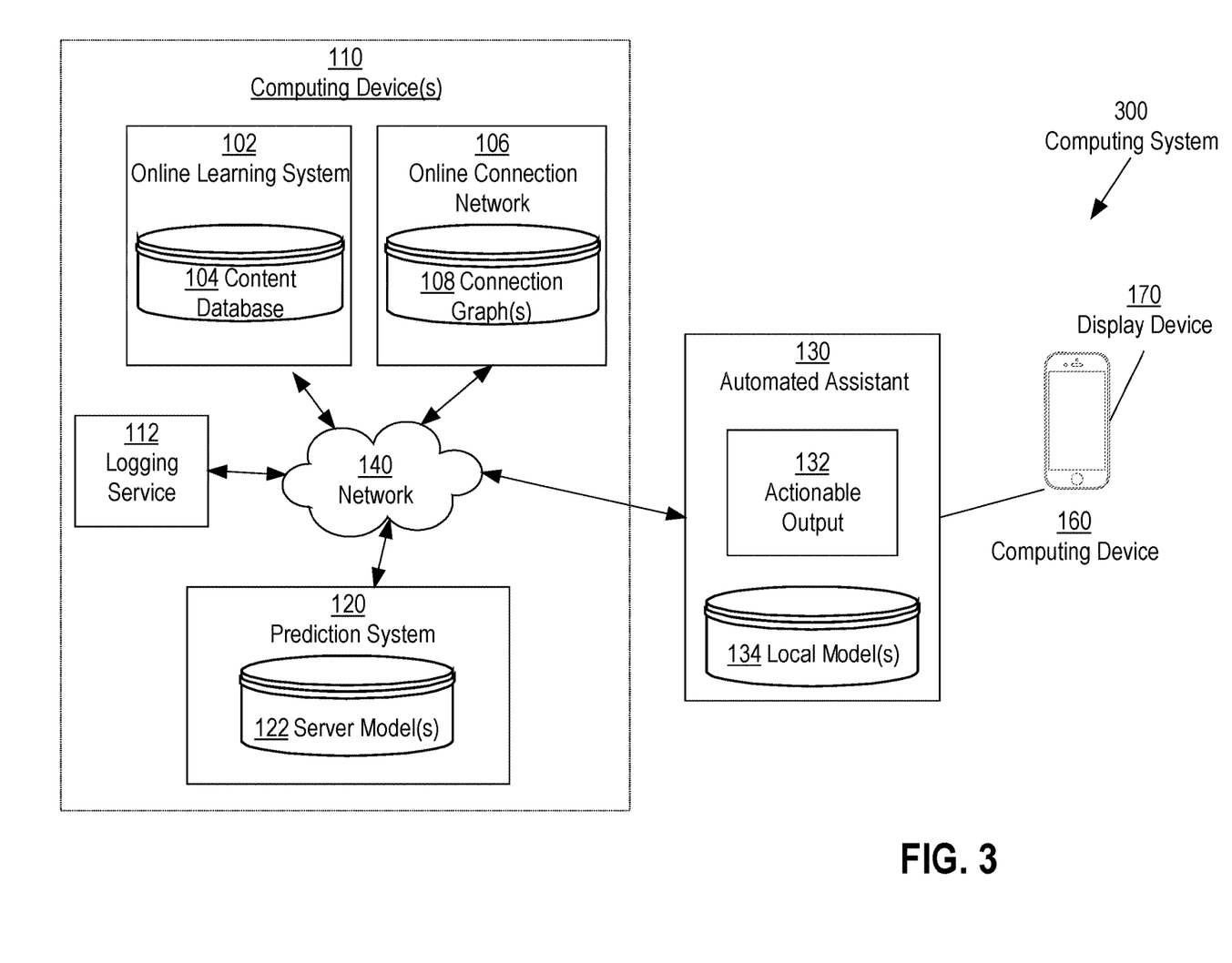
FIG. 3 is a block diagram of a networked computing environment, in an embodiment.

For purposes of providing a clear example, the operations of FIG. 1 are described as performed by computing device(s) 110, 160 of FIG. 3, which may be individually or collectively referred to as simply 'computing system 300.' In an embodiment, portions of process 100 may be implemented in machine-readable instructions of prediction system 120 alone or in combination with online learning system 102 and online connection network 106 of FIG. 3.

In operation 10, process 100 extracts digital data from an online connection network. The extracted digital data includes target profile data and current profile data. In an embodiment, operation 10 is performed by an automated data extraction process, such as an automated export process that runs periodically, online or offline. The target profile data is associated with an online submission process that has multiple possible outcomes and is executable via the online connection network. The current profile data is associated with a member node of the online connection network. Profile data includes skills, for example, and also or alternatively may include one or more other data extracted from the online connection network, such as qualifications, education, job titles, and/or other data that may have a relationship with an outcome of an automated submission process.

In operation 12, the target profile data is input to a model. In an embodiment, the model is a mathematical model, such as a machine learning-based model, which indicates relationships between profile data and outcomes of online submission processes. In an embodiment, the model indicates relationships between profile data and outcomes of online submission processes that the model has learned as a result of analyzing a training set of profile data.

Figure 4:
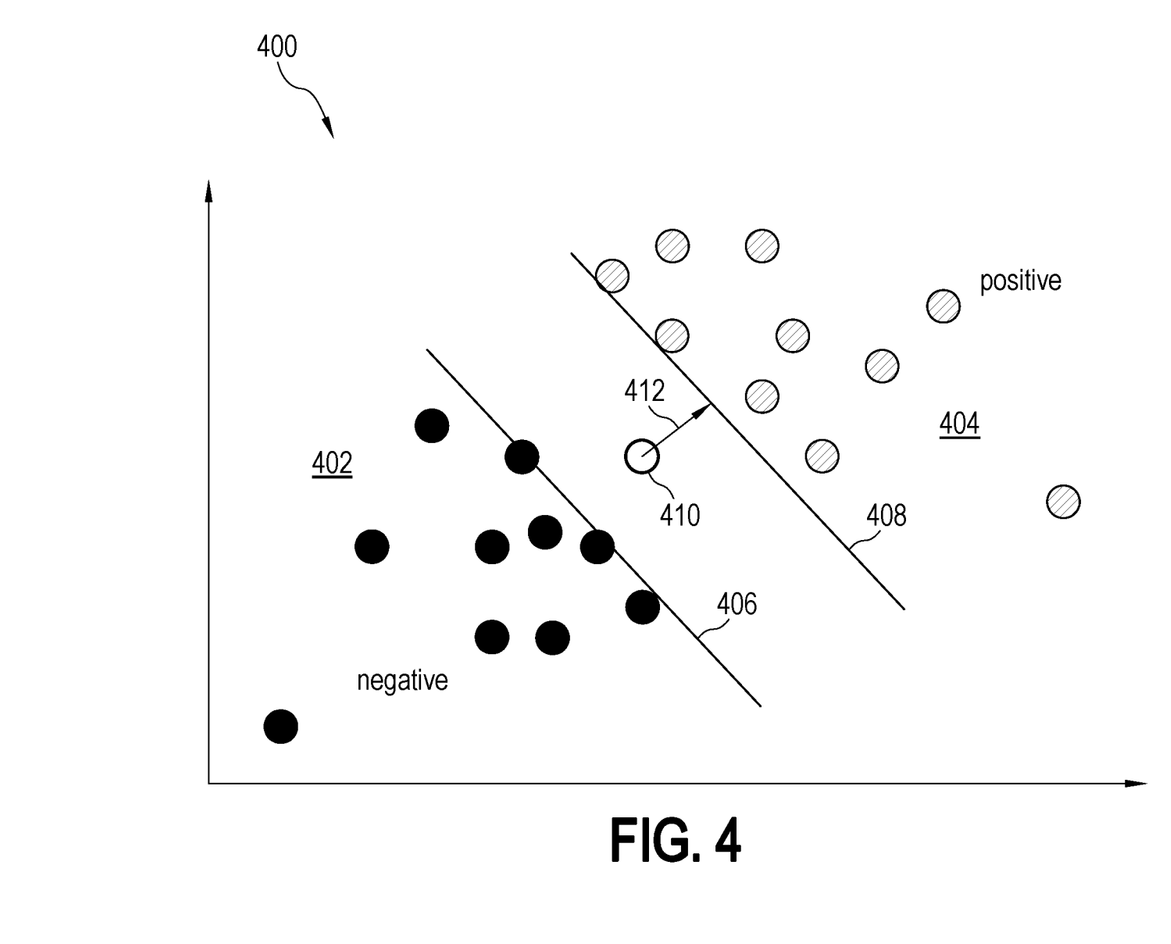
FIG. 4 is an example of a plot of boundary data, in an embodiment.

In response to the target profile data, the model of operation 12 outputs boundary data in operation 14. The boundary data differentiates profile data that is associated with positive outcomes of online submission processes that are similar to the online submission process from profile data that is associated with non-positive outcomes of online submission processes that are similar to the online submission process. An illustrative, non-limiting example of boundary data is shown in FIG. 4, described below.

In an embodiment, the model of operations 12 and 14 is created by inputting aggregated skills data to a machine learning process. In an embodiment, the aggregated skills data identifies one or more skills that are associated with a positive outcome of the online submission process. In an embodiment, the aggregated skills data also or alternatively identifies one or more skill that are associated with a non-positive outcome of the online submission process.

In operation 16, the boundary data is used to by an active learning process to determine minimum gap data and to use the minimum gap data to identify attribute data that is in the target profile data but is not in the current profile data. Using the active learning process, the attribute data is identified based on whether the attribute data is predicted to have a relationship with a positive outcome of the online submission process.

In an embodiment, the minimum gap data is determined by computing a distance that is representative of a similarity between the current profile data and the boundary data. For example, in an embodiment, the current profile data is represented as a data point in two-dimensional space, the boundary data is represented as a line or curve or hyperplane, in the same two-dimensional space, and the normal distance between the current profile data and the boundary data is measured in the two-dimensional space.

In an embodiment, the active learning process includes computing, for a subset of the profile data that is associated with positive outcomes of online submission processes, a dot product of the subset and the minimum gap data. For example, the dot product may be computed for multiple different subsets of the profile data each of which is associated with a positive outcome of an online submission process. The attribute data may be selected from a particular one of those subsets that has a largest dot product of all the computed dot products. For instance, the attribute data may be elected from the subset that has the maximum dot product out of all of the dot products that are computed by the active learning process in operation 16.

In operation 18, the attribute data produced by operation 16 is output for use by one or more downstream processes or by an automated assistant. For example, the attribute data may be used to determine a digital resource to associate with the member node through the online connection network or through an online learning system. An example of associating a digital resource with a member node is presenting a digital recommendation for the digital resource to the entity represented by the member node, via the online connection network or the online learning system. Examples of methods of presenting digital recommendations include electronic notifications including any combination of digital text, graphics, audio or video, asynchronous messaging, email, digital speech-based online chats. In an embodiment, the digital resource includes one or more of: a digital connection invitation relating to a particular other member node of the online connection network, digital video content of the online learning system, a digital communication relating to a virtual classroom, an output of a chatbot.

In an embodiment, a downstream process includes inputting the attribute data and activity data extracted from the online learning system to a machine learning process, and in response to the machine learning process, associating the member node with a virtual classroom. In an embodiment, a digital virtual classroom is an online forum that is created and maintained using the online connection network and an online learning system. Reinforcement learning technology is used identify learning criteria of individual member entities and form groups of member entities based on common learning criteria. Examples of common learning criteria include but are not limited to common profile data, common connections, common interactive behavior with respect to the same or similar digital resources, for example online training.

In an embodiment, a machine learning based approach is used to create a dynamic virtual classroom. To do this, profile data and online interaction data that are publicly available or approved for use by the member entities are obtained from a logging service and analyzed. An unsupervised learning technique is used to create an initial set of member groups, and each member group is used to form a virtual classroom. Learning activity that occurs in or in relation to the virtual classroom, such as members joining or leaving the virtual classroom, content viewing and creation, interactions with other members, is monitored and tracked with the members' permission. The collected data is then input to a supervised machine learning process that learns relationships between particular member entities and particular learning activity. These learned relationships are then used to further refine and improve the member groups used to form the virtual classrooms. For example, the learned relationships may be used to identify member entities that are good candidates for particular virtual classrooms.

In an embodiment, an example of a downstream process includes inputting the attribute data and activity data extracted from the online learning system to a different machine learning process, and in response to that machine learning process, associating a particular segment of video content of the online learning system with the member node.

In an embodiment, relationships between attribute data, learning activity, and digital content that are learned by the machine learning process are used to generate online course recommendations for member entities. In an embodiment, the machine learning process uses a multiple level hierarchy text classification model with the leaf nodes as the labels for online courses. In an embodiment, the course labelling output by the machine learning process is very specific, for example a particular segment or chapter of an online course is identified.

In an embodiment, another example of a downstream process includes providing the attribute data to an automated digital assistant, such as a chatbot. In an embodiment, the chatbot is implemented using a federated local chaining process that includes a local model and a server model, which are used in combination to generate and output personalized online learning recommendation data within a real-time time interval in response to a receiving of a member input by the chatbot.

In an embodiment, a text classification model produced by a supervised machine learning process is used to provide a smart learning support chatbot that can engage a member entity in a natural language question-and-answer style dialog about a particular learning topic or learning issue. The text classification model is used, in an embodiment, to match member questions with related answers in a real-time time interval that is perceived by the member as a conversational natural language dialog. To do this, the model is trained using a set of known questions and associated answers.

In an embodiment, the training data is categorized according to a set of topics that relate to the member entity's inquiry, and then each topic set of training data is used to create a micro-assistant model. In an embodiment, once a member entity's inquiry has been categorized using the model(s), the chatbot searches the member entity's connection graph, for example a subset of connection graph 108 that specifically pertains to the member entity, to identify a connection to recommend to the member entity to contact for help in responding to the inquiry. The chatbot may then output a digital recommendation to the member identity that includes the connection information.

Example Arrangement of Software Components

Figure 2:
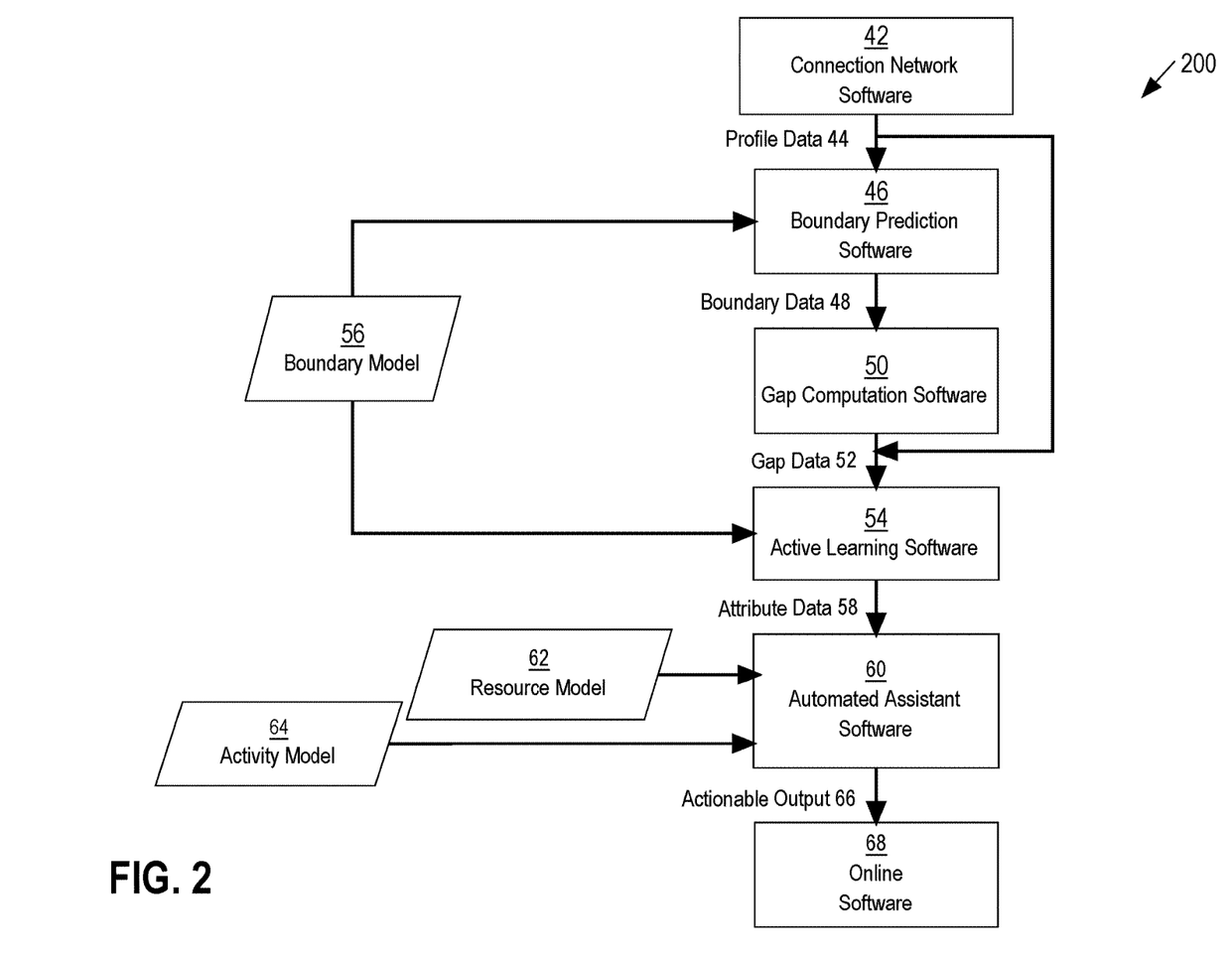
FIG. 2 is a block diagram of a software-based system, in an embodiment.

FIG. 2 is a block diagram that depicts an example of computer program product(s) and/or computer system 200 for automatically generating actionable output using the disclosed technologies, in an embodiment. The software-based components and digital data of the system of FIG. 2 include connection network software 42, profile data 44, boundary prediction software 46, boundary data 48, gap computation software 50, gap data 52, active learning software 54, boundary model 56, attribute data 58, automated assistant software 60, resource model 62, activity model 64, actionable output 66, online software 68.

Connection network software 42 includes computer code that is programmed to implement an online networking service for entities, such as a portion of online connection network 106. Online connection network 106 is described below with reference to FIG. 3.

Profile data 44 is digital data that is extracted from the nodes of a connection graph, such as a subset of connection graph 108, of connection network software 42. Portions of profile data are fed as input, for example as training data, to mathematical algorithms such as machine learning-based algorithms, to create models 56, 62, 64. Other portions of profile data 44 are fed as input to boundary prediction software 46. Profile data 44 is extracted from connection network software 42 using, for example, an export function. Profile data 44 can include raw data, such as particular skill identifiers, and/or computed features, such as statistics or probabilistic values, that are computed based on raw data.

Boundary model 56 is created by applying a learning algorithm to a set of profile data 44. In an embodiment, a support vector machine (SVM) algorithm is used to create boundary model 56. Boundary model 56 is used by boundary prediction software 46 to classify target profile data, which is a subset of profile data 44 that pertains to a target opportunity, such as a positive outcome of an online submission process. For example, target profile data may include names of skills that are listed in an online job posting, in an embodiment.

Boundary prediction software 46 uses boundary model 56 to classify target profile data as corresponding to either side of a boundary that delineates profile data that is associated with positive outcomes from profile data that is associated with non-positive outcomes, where boundary model 56 has learned the boundary via inputting of training data. Other suitable learning algorithms include but are not limited to supervised machine learning approaches more generally. Boundary prediction software 46 applies boundary model 56 to profile data 44 and outputs boundary data 48. Boundary data 48 indicates the boundary between positive outcome profile data and non-positive outcome profile data for a particular set of target profile data. Boundary data 48 is inputted to gap computation software 50.

Gap computation software 50 computes gap data 52 by measuring a distance, for example a distance in a two-dimensional space, between boundary data 48 and current profile data. Current profile data is a subset of profile data 44 that pertains to a particular member node. For example, current profile data may include names of skills that are listed in a member profile at a particular point in time. Gap data 52 is input to active learning software 54.

Active learning software 54 uses gap data 52 to identify attribute data candidates from the target profile data. Attribute data candidates are portions of the target profile data that may, if added to the current profile data, decrease the distance between the current profile data and the boundary data 48 for a particular member entity. Each attribute candidate is tested against the boundary data and boundary model 56 is used to produce the gap data for each candidate. A dot product between the candidate attribute data and gap data 52 is computed for each attribute candidate. An attribute candidate having a largest dot product of all of the computed dot products is output as attribute data 58. Attribute data 58 is output for use by automated assistant software 60, for example, or by a downstream process. An example of a selection of attribute data 58 using the disclosed methods is described below with reference to FIG. 4.

Automated assistant software 60 may be implemented as, for example, a chatbot or other type of automated intelligent assistant. Automated assistant software 60 uses models 62, 64 to determine actionable output 66. For example, automated assistant software 60 uses resource model 62 to map attribute data 58 to a particular segment of digital content of an online learning system or to a particular one or more member nodes of connection network software 42. In an embodiment, resource model 62 is created using, for example, a supervised machine learning algorithm that learns, through the ingesting of data, relationships between particular attribute data and particular actionable output.

Alternatively or in addition, automated assistant software 60 uses activity model 64 to learn a particular usage context of the particular entity whose current profile data is being evaluated by the system 200. Activity model 64 is created using, for example, a machine learning algorithm that learns, through the ingesting of data, relationships between particular digital content and particular user interactions in online connection network software and/or online learning software. In an embodiment, activity model 64 is created using training data that is obtained from logging service 112. Logging service 112 logs entity interaction data that is produced by online learning system 102 and/or online connection network 106 in operation. Examples of interaction data include digital data items, such as counts or frequencies of clicks, likes, views, shares, posts, comments, in relation to particular digital content and/or connection recommendations.

Automated assistant software 60 uses the entity-specific usage context data to, for example, tailor actionable output 66 based on the usage context of a particular entity. For example, automated assistant software 60 may choose a particular segment of a video to include in a digital recommendation based on the entity's past interaction history in the online learning software or may choose a particular connection recommendation or virtual classroom or chatbot response based on the entity's most recent previous interaction history in the online connection network and/or the online learning software.

Each or any of models 56, 62, 64 may be implemented as a searchable database or knowledge base that is part of a network service such as server model(s) 122 of prediction system 120. While models 56, 62, 64 have been described as created using supervised machine learning techniques, other suitable techniques may be used in accordance with the requirements of a particular design or implementation of system 200. For example, an unsupervised clustering technique may be used to warm-start the system when there is a lack of available training data.

In an embodiment, automated assistant software 60 provides actionable output 66 for use by online software 68. In another embodiment, automated assistant software 60 provides actionable output 66 for use by a downstream process, such as a downstream process of automated assistant software 60. Examples of actionable output 66 include but are not limited to digital content recommendations, online connection recommendations, chatbot output, virtual classroom recommendations.

Online software 68 uses actionable output 66 to drive runtime decisions that are made by online software 68. Online software 68 is, for example, a portion of online learning software 102 or a portion of online connection network 106. Examples of runtime decisions that online software 68 may use actionable output 66 to make include choosing one branch of computer code to execute over another, choosing one form of output over another, choosing one digital resource to output over another.

Example Networked System Environment

FIG. 3 is a block diagram that depicts an example computing system 300 arranged to operate online learning system 102, content database 104, online connection network 106, connection graph(s) 108, logging service 112, prediction system 120, server model(s) 122, automated assistant 130, actionable output 132, local model(s) 134, in an embodiment. Computing system 300 includes computing device(s) 110, computing device 160, and display device 170, which are communicatively coupled to an electronic communications network 140.

Implemented in the devices 110, 160, 170, using computer software, hardware, or software and hardware, are processor-executable instructions, data structures, and digital data, stored in memory, which cooperate to provide the computer-implemented functionality shown in the drawings and described herein. For ease of discussion, these computer-implemented components are represented schematically in FIG. 3 as online learning system 102, content database 104, online connection network 106, connection graph(s) 108, logging service 112, prediction system 120, server model(s) 122, automated assistant 130, actionable output 132, local model(s) 134.

"System" as used herein may refer to a single computer or network of computers and/or other devices. "Computing device" as used herein may refer to a computer or any other electronic device that is equipped with a processor. Although computing system 300 may be implemented with any number of online learning system 102, content database 104, online connection network 106, automated assistant 130, computing device(s) 110, display device 170 and computing device 160, respectively, in this disclosure, these elements may be referred to in the singular form for ease of discussion.

Online learning system 102, online connection network 106, logging service 112, prediction system 120, automated assistant 130 are shown as separate elements in FIG. 3 for ease of discussion but the illustration is not meant to imply that separation of these elements is required. The illustrated systems (or their functionality) and data stores may be divided over any number of physical systems, including a single physical computer system, and can communicate with each other in any appropriate manner.

Portions of automated assistant 130, online learning system 102, online connection network 106, prediction system 120 may be implemented using a Web server computer that communicates with Web browser software running on computing device 160. In an embodiment, automated assistant 130 enables access to different portions of the functionality of computing system 300, by computing device 160. For example, web pages containing views of a connection graph 108 or digital content of content database 104 may be displayed as part of actionable output 132.

In an embodiment, all or portions of local model(s) 134 may be stored in memory of computing device 160. A portion of automated assistant 130 may coordinate exchanges of data between local model(s) 134 and server model(s) 122. In an embodiment, system 300 uses a federated local chaining technique which allows system 300 to use local model(s) 134 to provide real-time actionable output 132 via computing device 160 and pass updated model parameter(s) to server model(s) 122.

As used herein, real-time may refer to a time interval that is an actual period of time during which a process or event occurs. For example, real time may refer to the ability of a computer system to receive an input and analyze and provide virtually immediate output in response to the input. In some embodiments, real time is measured in seconds or milliseconds. In other embodiments, real time is determined based on an end user's perception of system responsiveness.

Portions of the illustrative online learning system 102, content database 104, online connection network 106, connection graph(s) 108, logging service 112, prediction system 120, server model(s) 122, automated assistant 130, actionable output 132, local model(s) 134 may be implemented using web-based software applications and hosted by a hosting service (not shown). For example, portions of online learning system 102, content database 104, online connection network 106, connection graph(s) 108, logging service 112, prediction system 120, server model(s) 122, automated assistant 130, actionable output 132, local model(s) 134 may be implemented as client-side and server-side portions, respectively, of a network service. In an embodiment, portions of automated assistant 130 are implemented in a web browser that can execute on computing device 160.

In an embodiment, portions of online learning system 102, content database 104, online connection network 106, connection graph(s) 108, logging service 112, prediction system 120, server model(s) 122, automated assistant 130, actionable output 132, local model(s) 134, may be implemented as client-side and server-side portions, respectively, of a connection network service such as the LINKEDIN software, which is commercially available from LinkedIn Corporation of Sunnyvale, Calif. alone or in combination with an online learning platform such as LINKEDIN LEARNING, which is commercially available from LinkedIn Corporation of Sunnyvale, Calif.

In some embodiments, computing device 160 is a client-side computing device, such as a smart phone, tablet computer, wearable or body-mounted device, smart appliance, laptop machine, or combination of any of such devices, and computing device(s) 110 are server-side computing devices such as a server computer or network of server computers accessible by the Internet, for example in a public or private cloud. As illustrated in FIG. 3, display device 170 is implemented in computing device 160, but may be implemented as a separate device or as part of another device, or as multiple networked display devices, in other implementations.

Online learning system 102 is, in an embodiment, an online learning platform that serves as a front-end to content database 104. For example, online learning system 102 may provide a search interface to content database 104, alternatively or in addition to other features such as a chatbot-based question and answer speech-enabled dialog system, a virtual classroom, video player/recorders, and/or other learning-based functionality. In some embodiments, online learning system 102 is another type of online system, such as an online platform for viewing products or property for sale and submitting offers, or any type of online application submission platform.

Content database 104 is, in an embodiment, a searchable repository of digital materials, such as audio, video, text, and multi-media content. Content database 104 can be implemented as a single database or as multiple databases and may be implemented on a single server computer, multiple server computers, or a combination of client and server computers.

Online connection network 106 is a computer-implemented networking service for entities, such as a professional networking service or an online social network. Online connection network 106 contains nodes that represent entities using online connection network 106. Data associated with nodes and connections between nodes are represented using a connection graph 108. In the context of online service 106, "node" may refer to a software abstraction of entity data and need not be tied to any particular hardware or machine that is connected to network 140.

Some implementations of online connection network 106 allow entities (via users operating electronic devices) to register with online connection network 106 (thereby creating a node on online service 106), create entity data (for example, profile data), establish connections with other registered entities, and perform other actions, such as message other entities, post articles, view postings from other entities, comment on postings, "like" postings, endorse other entities or established connections, etc. An entity profile may include, for example, a name of the entity, a job title, a job industry, academic institutions attended, employment status, previous and current employers, skills, endorsements from other entities, contact information, address information.

In an embodiment, online connection network 106 manages operations performed by and interactions between nodes of a connection network. Nodes and interactions between nodes of the connection network may be implemented using connection graph(s) 108. For instance, a node may store profile data and/or activity data that is associated with one or more entities that use the online system. Edges connecting two nodes in connection graph(s) 108 may represent relationships between the connected nodes. An edge may store data that is associated with the relationship between the connected nodes.

In an embodiment, logging service 112 logs interaction data and extracts features and labels from interaction data using SAMZA (open-source software for near-real time, asynchronous stream processing, provided by the Apache Software Foundation). In an embodiment, features and labels are output for use by prediction system 120 using KAFKA (open-source software for building real-time data pipelines, provided by the Apache Software Foundation). Other software products providing similar or equivalent functionality as the software products mentioned in this disclosure are used in other embodiments.

Examples of interactions that may be tracked by logging service 112 include entity interactions with nodes and/or content items, such as sending and receiving electronic connection requests and messages. Examples of entity interactions with content items include viewing, liking, sharing, or commenting on particular content items. Thus, in an embodiment, interaction data identifies, for a tracked event, node(s) and/or content item(s) involved in the event as well as the associated online interaction(s). Examples of online interactions include mouse clicks, taps, scrolls, swipes, and other interactions with a user interface. Interaction data may include labels that characterize the online interactions. Examples of labels are text descriptions such as "view," "share," "connect," "decline," "comment."

Prediction system 120 is, in an embodiment, a network service that is programmed with computer code to perform at least some of the operations of process 10 of FIG. 1, in an embodiment. In an embodiment, prediction system 120 is programmed using computer code to perform operations 12, 14, and 16 of process 10 while logging service 112 is programmed to perform operation 10 of FIG. 1 and automated assistant 130 is programmed to perform operation 18 of FIG. 1. In other embodiments, prediction system 120 may be programmed to perform all of the operations of process 100 of FIG. 1 or a variation of process 100 that encompasses subject matter of this disclosure.

In an embodiment, automated assistant 130 is implemented as a chatbot that is coupled to both an online connection network and another online service, such as an online learning system. Automated assistant 130 uses local model(s) 134 to produce actionable output 132 in a real-time time interval, in an embodiment. In an embodiment, local model(s) 134 are created using a machine learning process as described herein.

Server model(s) 122 are, in an embodiment, part of a network service that manages a model cluster that includes one or more predictive models that are accessed and used by prediction system 120 to generate attribute data, for example attribute data 58. In an embodiment, server model(s) 122 are created using a machine learning process as described herein.

Network 140 may be implemented on any medium or mechanism that provides for the exchange of data between the devices that are connected to the network. Examples of network 140 include, without limitation, a network such as a Local Area Network (LAN), Wide Area Network (WAN), Ethernet or the Internet, or one or more terrestrial, satellite or wireless links. Network 140 may include a combination of networks, such as a combination of wired and wireless networks, as needed to enable communications between the computing device(s) 110, 140.

Computing device 160 operates automated assistant 130 to establish logical connection(s) over network 140 with portions of online learning system 102, online connection network 106, logging service 112, prediction system 120, at various times as needed for the operation of computing system 300.

Example: Network-Based Learning Platform

In an embodiment, non-positive and positive sampled profile data is used to train a machine learning-based model, such as an SVM model, following an SVM training algorithm for bi-class classification. FIG. 4 shows an example of a plot 400 of boundary data, in an embodiment. The boundary data of plot 400 is produced by boundary prediction software 46, described above, in an embodiment.

Plot 400 includes data points 402, which are correlated with negative or non-positive outcomes of an automated submission process, and data points 404, which are correlated with a positive outcome of an automated submission process. Lines or hyperplanes 406, 408 delineate areas of plot 400 that are associated with non-positive and positive outcomes, respectively.

Data point 410 represents current profile data for a particular member entity at a particular point in time. Line 412 represents a distance between data point 410 and positive outcome boundary 408. In an embodiment, distance 412 is computed by gap computation software 50, described above.

In an embodiment, data point 410 and the model, indicated by data points 402, 404 and boundaries 406, 408 of plot 400. are passed to active learning, where an orientated distance from the data point 410 to the positive decision boundary 408 in the model is evaluated and treated as the minimal gap that is used to predict attribute data that will move data point 410 across boundary 408.

The following is a non-limiting, illustrative example of a minimum gap computation and attribute selection according to this disclosure.

Let a member entity M have current skills [mysql, hive, spark] as extracted from profile data. Each current skill is converted to a vector where the dimensions of the vector indicate characteristics of the skill.

Mysql: [0.02 0.13 −0.05 . . . ]
Hive: [−0.09 0.05 −0.12 . . . ]
Spark: [−0.08 0.05 −0.2 . . . ]

A clustering approach, such as k-means clustering, is used to group similar skills together. Here, hive and spark are similar, resulting in two clusters [(mysql), (hive, spark)], and vector representations:

(mysql): [0.02 0.13 −0.05 . . . ]
(hive, spark): [−0.085 0.05 −0.16 . . . ]

The average of the skill vectors for this member is computed: [−0.0325, 0.09, −0.105, . . . ]. The above process may be repeated for many member entities in order to generate training data for an SVM model.

With the SVM model having been created, the minimal gap is determined for the individual member having skills as [scala, presto] with skill-to-vectors as:

Scala: [−0.17 0.04 0.14 . . . ]
Presto: [−0.07 0.06 −0.1 . . . ]

If each skill forms a single cluster, the average vector is computed as [−0.12, 0.05, 0.02, . . . ]. The distance to the positive decisive boundary is computed as: [0.05, 0.03, 0.01, . . . ].

The boundary vector is used to compute a dot product against each vector in the positive outcome skill data (mysql, hive, spark, presto, . . . ). If the dot product between mysql and the distance is the largest of all dot products computed, mysql is identified as the skill that is predicted to best close the minimum gap.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
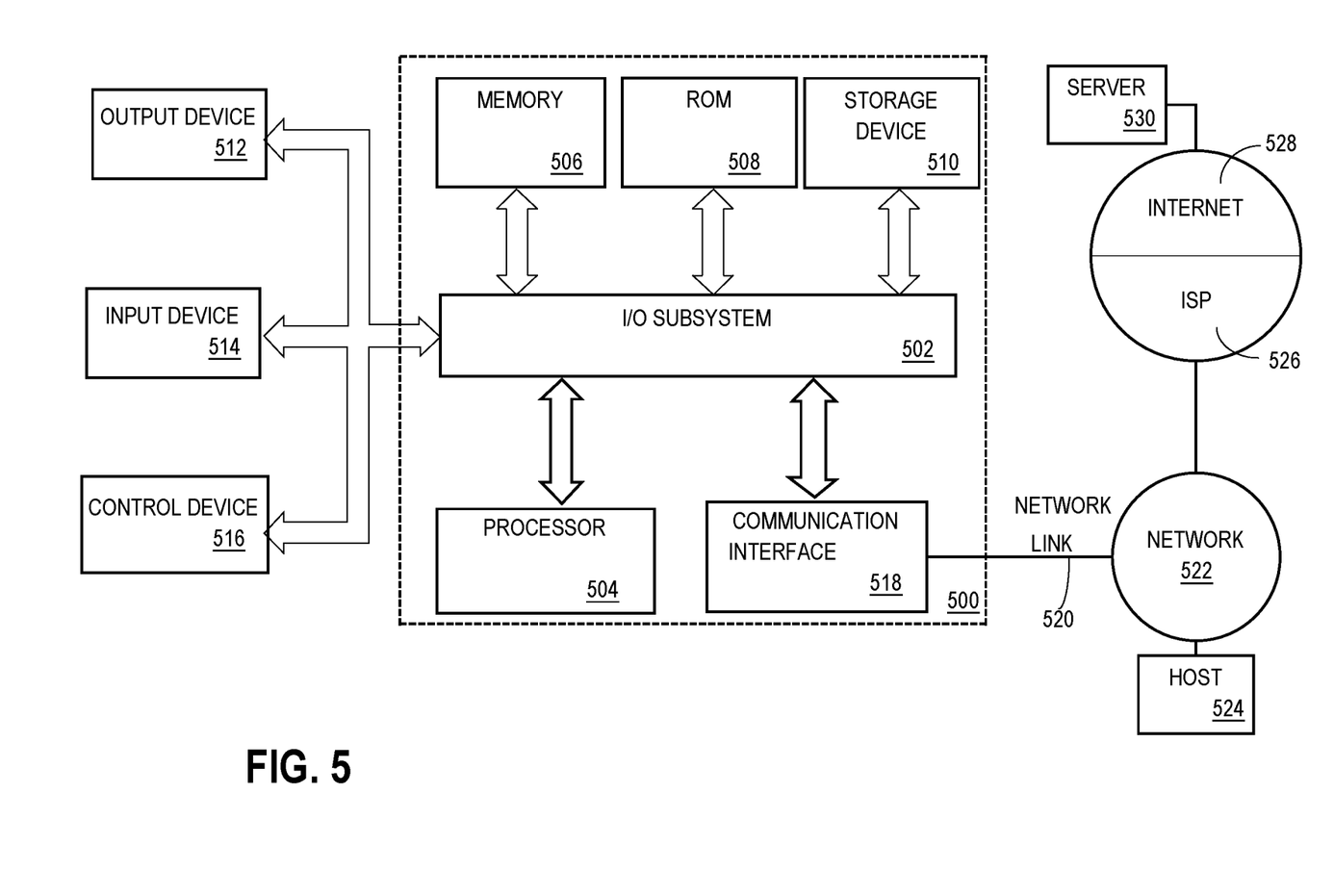
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-profile storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion.

Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid profile drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-profile drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes extracting, from an online connection network, digital data including target profile data and current profile data; where the target profile data is associated with an online submission process that has a plurality of possible outcomes and is executable via the online connection network; where the current profile data is associated with a member node of the online connection network; using an active learning process, in response to the current profile data, identifying attribute data that is in the target profile data but is not in the current profile data and is predicted to have a relationship with a positive outcome of the online submission process; outputting the attribute data for use by a downstream process or an automated digital assistant to determine a digital resource to associate with the member node through the online connection network or through an online learning system; where the method is performed by one or more computing devices.

An example 2 includes the subject matter of example 1, and includes, in response to the target profile data, via a model that indicates learned relationships between profile data and outcomes of online submission processes, outputting boundary data that differentiates profile data associated with positive outcomes of online submission processes similar to the online submission process from profile data associated with non-positive outcomes of online submission processes similar to the online submission process.

An example 3 includes the subject matter of example 2, including determining minimum gap data by computing a distance representative of a similarity between the current profile data and the boundary data. An example 4 includes the subject matter of example 3, where using the active learning process includes, for a subset of the profile data associated with positive outcomes of online submission processes, computing a dot product of the subset and the minimum gap data. An example 5 includes the subject matter of example 4, including identifying the attribute data by computing the dot product for a plurality of different subsets of the profile data associated with positive outcomes of online submission processes and selecting the attribute data from a particular subset of the profile data associated with positive outcomes of online submission processes that has a largest dot product of the computed dot products. An example 6 includes the subject matter of any of examples 1-5, where the digital resource includes one or more of: a digital connection invitation relating to a particular other member node of the online connection network, digital video content of the online learning system, a digital communication relating to a virtual classroom, or an output of a chatbot. An example 7 includes the subject matter of any of examples 1-6, including inputting the attribute data and activity data extracted from the online learning system to a machine-learned model, and in response to the machine learning process, associating the member node with a virtual classroom. An example 8 includes the subject matter of any of examples 1-7, including inputting the attribute data and activity data extracted from the online learning system to a machine learning process, and in response to the machine-learned model associating a particular segment of video content of the online learning system with the member node. An example 9 includes the subject matter of any of examples 1-8, where the attribute data is provided to a chatbot that uses a federated local chaining process including a local model and a server model to generate and output personalized online learning recommendation data within a real-time time interval in response to a receiving of a member input by the chatbot. An example 10 includes the subject matter of any of examples 1-9, where: the active learning process uses a machine-learned model that is created by inputting aggregated skills data to a machine learning process; the aggregated skills data identifies: skills data that is associated with a positive outcome of the plurality of possible outcomes of the online submission process; skills data that is associated with a non-positive outcome of the plurality of possible outcomes of the online submission process.

In an example 11, a computer program product including one or more non-transitory computer-readable storage media including instructions which, when executed by one or more processors, cause: extracting, from an online connection network, digital data including target profile data and current profile data; where the target profile data is associated with an online submission process that has a plurality of possible outcomes and is executable via the online connection network; where the current profile data is associated with a member node of the online connection network; using an active learning process, in response to the current profile data, identifying attribute data that is in the target profile data but is not in the current profile data and is predicted to have a relationship with a positive outcome of the online submission process; outputting the attribute data for use by a downstream process or an automated digital assistant to determine a digital resource to associate with the member node through the online connection network or through an online learning system.

An example 12 includes the subject matter of example 11, where the instructions further cause, in response to the target profile data, via a model that indicates learned relationships between profile data and outcomes of online submission processes, outputting boundary data that differentiates profile data associated with positive outcomes of online submission processes similar to the online submission process from profile data associated with non-positive outcomes of online submission processes similar to the online submission process. An example 13 includes the subject matter of example 12, where the instructions further cause determining minimum gap data by computing a distance representative of a similarity between the current profile data and the boundary data. An example 14 includes the subject matter of example 13, where using the active learning process includes, for a subset of the profile data associated with positive outcomes of online submission processes, computing a dot product of the subset and the minimum gap data. An example 15 includes the subject matter of example 14, where the instructions further cause identifying the attribute data by computing the dot product for a plurality of different subsets of the profile data associated with positive outcomes of online submission processes and selecting the attribute data from a particular subset of the profile data associated with positive outcomes of online submission processes that has a largest dot product of the computed dot products. An example 16 includes the subject matter of any of examples 11-15, where the digital resource includes one or more of: a digital connection invitation relating to a particular other member node of the online connection network, digital video content of the online learning system, a digital communication relating to a virtual classroom, or an output of a chatbot. An example 17 includes the subject matter of any of examples 11-16, where the instructions further cause inputting the attribute data and activity data extracted from the online learning system to a machine-learned model, and in response to the machine learning process, associating the member node with a virtual classroom. An example 18 includes the subject matter of any of examples 11-17, where the instructions further cause inputting the attribute data and activity data extracted from the online learning system to a machine learning process, and in response to the machine-learned model associating a particular segment of video content of the online learning system with the member node. An example 19 includes the subject matter of any of examples 11-18, where the attribute data is provided to a chatbot that uses a federated local chaining process including a local model and a server model to generate and output personalized online learning recommendation data within a real-time time interval in response to a receiving of a member input by the chatbot. An example 20 includes the subject matter of any of examples 11-19, where: the active learning process uses a machine-learned model that is created by inputting aggregated skills data to a machine learning process; the aggregated skills data identifies: skills data that is associated with a positive outcome of the plurality of possible outcomes of the online submission process; skills data that is associated with a non-positive outcome of the plurality of possible outcomes of the online submission process.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   extracting, from an online connection network, digital data comprising target profile data and current profile data;
   wherein the target profile data is associated with an online submission process;
   wherein the current profile data is associated with a node of the online connection network;
   generating, using a machine learning model, a boundary model based on a portion of the digital data;
   predicting, using a prediction model, attribute data that is associated with a positive outcome based on the boundary model and the digital data;
   classifying, by the machine learning model, the current profile data that is associated with positive outcomes;
   computing gap data as a measure of a distance between the current profile data and a side of a boundary line of the boundary model that is associated with positive outcomes;
   inputting the gap data into an active learning process;
   identifying, by the active learning process, a portion of the attribute data that is in the target profile data but is not in the current profile data;
   determining that a sub-portion of the attribute data added to the current profile data minimizes the distance between the current profile data and the side of the boundary line of the boundary model that is associated with the positive outcomes;
   outputting the attribute data to a downstream process or an automated digital assistant or the online connection network or through an online learning system; and
   associating, based on the sub-portion of the attribute data, a particular segment of video content with the node through the downstream process or the automated digital assistant or the online connection network or the online learning system;
   wherein the method is performed by one or more computing devices.

2. The method of claim 1, further comprising outputting, by the machine learning model, the boundary model, wherein the boundary model comprises positive outcome boundary data, non-positive outcome boundary data, and the boundary line of the boundary model, the boundary line differentiates positive outcomes of online submission processes from non-positive outcomes of online submission processes, and the machine learning model is trained with training profile data.

3. The method of claim 2, further comprising determining minimum gap data by computing a distance representative of a similarity between the current profile data and the boundary line of the boundary model.

4. The method of claim 3, wherein using the active learning process comprises, for a subset of the target profile data associated with positive outcomes of online submission processes, computing a dot product of the subset and the minimum gap data.

5. The method of claim 4, wherein identifying the sub-portion of attribute data comprises computing the dot product for a plurality of different subsets of the target profile data associated with positive outcomes of online submission processes and selecting the sub-portion of attribute data from a particular subset of the target profile data associated with positive outcomes of online submission processes that has a largest dot product of the computed dot products.

6. The method of claim 1, wherein inputting the attribute data comprises:
   extracting the attribute data, from the online learning system;
   inputting the attributes to a second machine-learned model; and
   associating the node with a virtual classroom.

7. The method of claim 1, wherein inputting the attribute data comprises:
   extracting the attribute data from the online learning system using a second machine-learned model.

8. The method of claim 1, wherein the sub-portion of attribute data is provided to a chatbot that uses a federated local chaining process including a local model and a server model to generate and output personalized online learning recommendation data within a real-time time interval in response to a receiving of a member input by the chatbot.

9. The method of claim 1, wherein:
   the active learning process uses a machine-learned model that is created by inputting aggregated skills data to a machine learning process;
   the aggregated skills data identifies:
   skills data that is associated with a positive outcome of a plurality of possible outcomes of the online submission process; and
   skills data that is associated with a non-positive outcome of the plurality of possible outcomes of the online submission process.

10. A computer program product comprising one or more non-transitory computer-readable storage media comprising instructions which, when executed by one or more processors, cause:

extracting, from an online connection network, digital data comprising target profile data and current profile data;

wherein the target profile data is associated with an online submission process;

wherein the current profile data is associated with a node of the online connection network;

generating, using a machine learning model, a boundary model based on a portion of the digital data;

predicting, using a prediction model, attribute data that is associated with a positive outcome based on the boundary model and the digital data;

classifying, by the machine learning model, the target profile data on a side of a boundary line of the boundary model that is associated with positive outcomes;

computing gap data as a measure of a distance between the current profile data and the side of a boundary line of the boundary model that is associated with positive outcomes;

inputting the gap data into an active learning process;

identifying, by the active learning process, a sub-portion of attribute data that is in the target profile data but is not in the current profile data;

determining that the attribute data added to the current profile data, minimizes the distance between the current profile data and the side of the boundary line of the boundary model that is associated with the positive outcomes;

outputting the attribute data to a downstream process or an automated digital assistant or the online connection network or through an online learning system; and associating, based on the sub-portion of attribute data, a particular segment of video content with the node through the downstream process or the automated digital assistant or the online connection network or the online learning system.

11. The computer program product of claim 10, wherein the instructions further cause, outputting, by the machine learning mode, the boundary model comprising positive outcome boundary data, non-positive outcome boundary data, and the boundary line of the boundary model, wherein the boundary line differentiates positive outcomes of online submission processes from non-positive outcomes of online submission processes, wherein the machine learning model is trained with training profile data.

12. The computer program product of claim 11, wherein the instructions further cause determining minimum gap data by computing a distance representative of a similarity between the current profile data and the boundary line of the boundary model.

13. The computer program product of claim 12, wherein using the active learning process comprises, for a subset of the target profile data associated with positive outcomes of online submission processes, computing a dot product of the subset and the minimum gap data.

14. The computer program product of claim 13, wherein the instructions further cause identifying the attribute data by computing the dot product for a plurality of different subsets of the target profile data associated with positive outcomes of online submission processes and selecting the sub-portion of attribute data from a particular subset of the target profile data associated with positive outcomes of online submission processes that has a largest dot product of the computed dot products.

15. The computer program product of claim 10, wherein the instructions further cause inputting the attribute data and activity data extracted from the online learning system to a machine-learned model, and in response to output of the machine-learned model, associating the node with a virtual classroom.

16. The computer program product of claim 10, wherein the instructions further cause inputting the attribute data and activity data extracted from the online learning system to a machine-learned model.

17. The computer program product of claim 10, wherein the attribute data is provided to a chatbot that uses a federated local chaining process including a local model and a server model to generate and output personalized online learning recommendation data within a real-time time interval in response to a receiving of a member input by the chatbot.

18. The computer program product of claim 10, wherein:
the active learning process uses a machine-learned model that is created by inputting aggregated skills data to a machine learning process;
wherein the aggregated skills data identifies:
skills data that is associated with a positive outcome of a plurality of possible outcomes of the online submission process; and
skills data that is associated with a non-positive outcome of the plurality of possible outcomes of the online submission process.

* * * * *